United States Patent [19]

Charransol et al.

[11] 4,154,982

[45] May 15, 1979

[54] SWITCHING NETWORK FOR ESTABLISHING TWO-WAY CONNECTIONS BETWEEN SELECTED SUBSCRIBERS AND AN AUTOMATIC EXCHANGE IN A PCM TELEPHONE SYSTEM

[75] Inventors: Pierre Charransol; Jacques Hauri; Claude Athènes, all of Paris, France

[73] Assignee: Societe des Telephones Ste (Thomson-Ericsson), Paris, France

[21] Appl. No.: 849,253

[22] Filed: Nov. 7, 1977

[30] Foreign Application Priority Data

Nov. 9, 1976 [FR] France .................................. 76 33747

[51] Int. Cl.² .......................................... H04Q 11/04
[52] U.S. Cl. ............................ 179/15 AT; 179/18 FC
[58] Field of Search ...................... 179/18 FC, 15 AT

[56] References Cited

U.S. PATENT DOCUMENTS

| | | | |
|---|---|---|---|
| 3,492,435 | 1/1970 | Inose et al. | 179/18 FC |
| 4,020,290 | 4/1977 | Perna et al. | 179/15 AT |
| 4,075,432 | 2/1978 | Renaudin | 179/18 FC |
| 4,123,624 | 10/1978 | Gagnier et al. | 179/15 AT |

Primary Examiner—William C. Cooper
Attorney, Agent, or Firm—Karl F. Ross

[57] ABSTRACT

A switching network with $k=p+q$ inputs and as many outputs comprises one or more symmetrical time-division matrices, k being eight or a multiple of eight in the embodiments specifically disclosed. A larger number p of incoming subscriber links and a smaller number q of exchange outputs are respectively connected to p outgoing subscriber links and q exchange inputs. Digitized voice samples arriving over each incoming link in successive time slots of a recurrent frame, allocated to respective subscribers, are stored in each matrix and are selectively distributed to the reduced number of time slots sent to the exchange under the control of switching instructions from the exchange; conversely, signal samples received from the exchange in successive time slots are distributed to selected time slots of outgoing links. Signal paths can also be established between network inputs and outputs connected to incoming and outgoing links, thereby enabling direct communication between subscribers served by the network.

6 Claims, 6 Drawing Figures

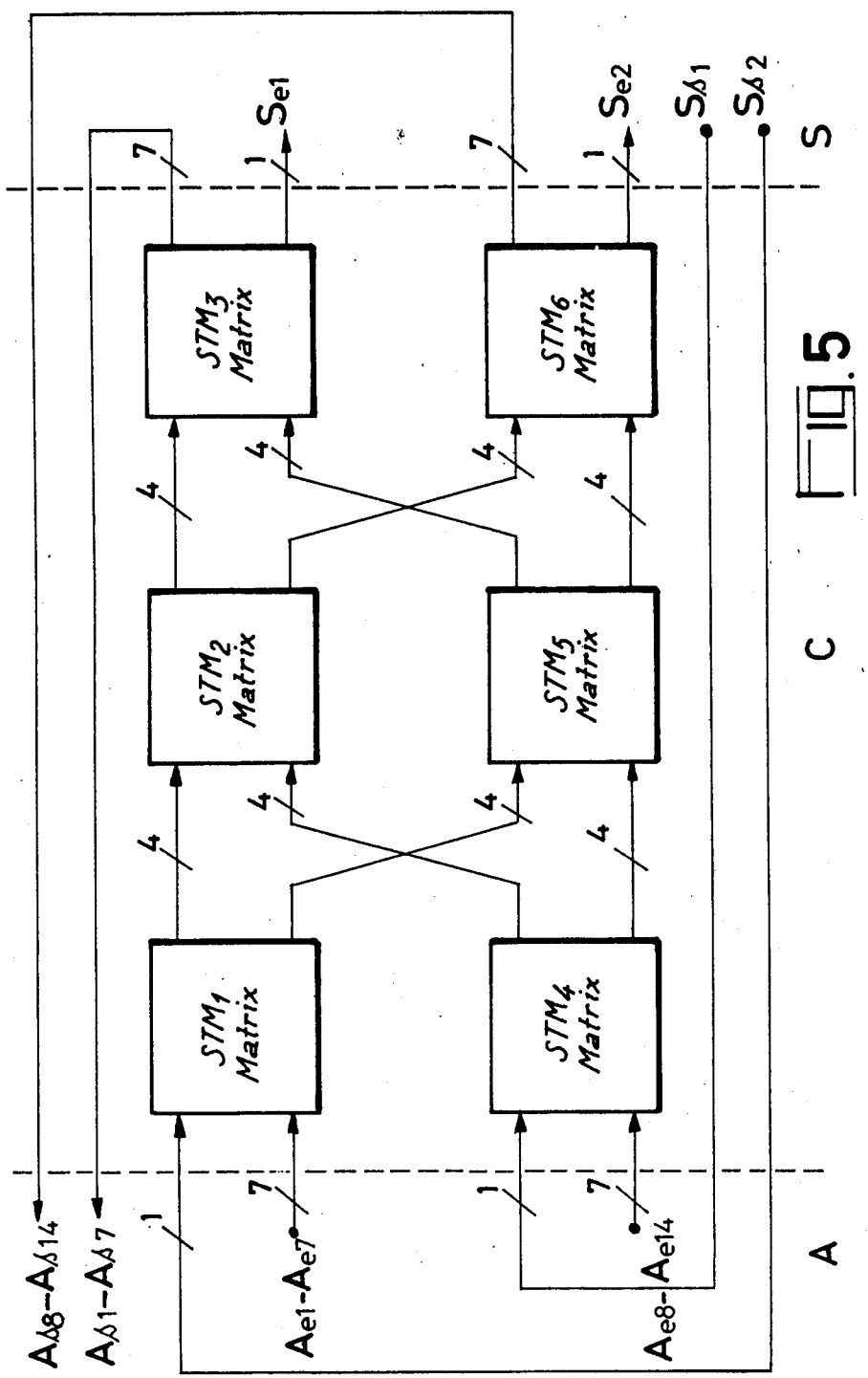

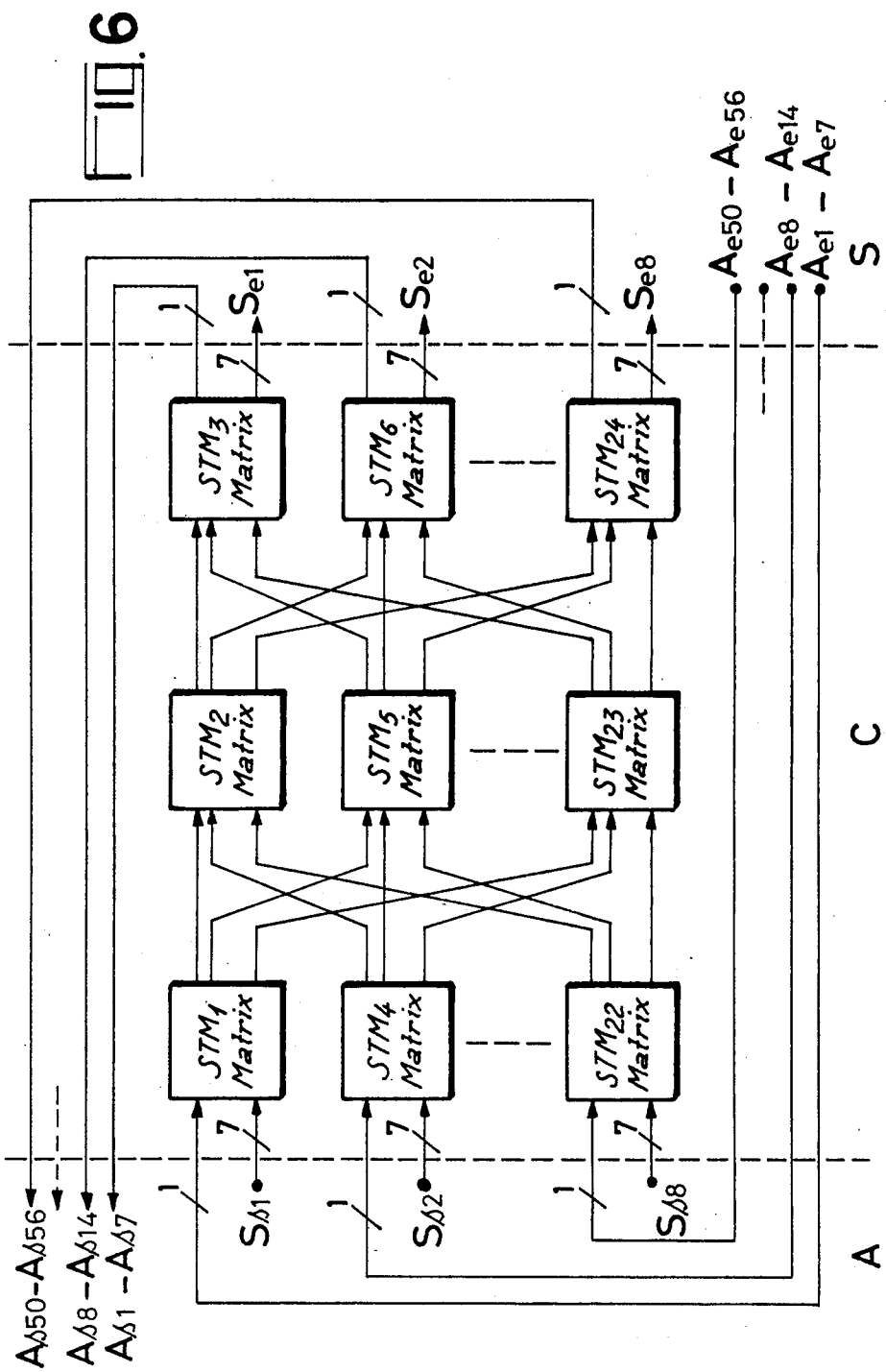

SWITCHING NETWORK FOR ESTABLISHING TWO-WAY CONNECTIONS BETWEEN SELECTED SUBSCRIBERS AND AN AUTOMATIC EXCHANGE IN A PCM TELEPHONE SYSTEM

CROSS-REFERENCE TO RELATED APPLICATION

This application contains subject matter disclosed in our copending and commonly owned application Ser. No. 768,632 filed Feb. 14, 1977, now U.S. Pat. No. 4,093,827.

FIELD AND BACKGROUND OF THE INVENTION

Our present invention relates to a switching network of the concentrator-deconcentrator type by which it is possible to connect to an automatic telephone exchange a number of subscribers larger than the total number of signal paths available between the network and the automatic switching equipment of the exchange. To this end, we make use of the well-known fact that not all subscribers use their lines at the same time, so that it is possible to provide only some of them with simultaneous access to the switching network and hence to reduce the size of this network, albeit at the expense of a certain risk of blocking.

The invention also relates to satellites which are independent concentrator-deconcentrator networks disposed at a distance from the exchange for the benefit of a group of isolated and remote subscribers. These satellites optionally provide for local calls to be made between the subscribers of this group without passing through the exchange.

In conventional telephone exchanges, it is known to use for this purpose, for example, rotary selectors whose inputs are connected to the subscriber lines and multiplied between them and whose wipers are connected to the switching network. The more recent versions of exchanges use cross-bar selectors, although the principle of operation is essentially the same.

In electronic time-division telephone switching systems operating with pulse-code modulation (PCM), a concentration system such as this may of course be used, but the arrangement is far from being optimal in terms of dimensions and cost.

In our above-identified application and patent we have disclosed and claimed a new electronic circuit component called a symmetrical time-division matrix (STM). In one particular embodiment, this circuit component enables each of the time slots (TS) of eight incoming PCM junctions of 32 time slots each to be switched to one of the time slots of eight outgoing PCM junctions also comprising 32 time slots each. Under the control of an external signal, internal addressing circuits enable the distribution of the 256 possible space-time routes to be modified. Such matrices can be used for forming the entire switching network of an automatic electronic exchange, irrespective of the size of the network.

OBJECTS OF THE INVENTION

The general object of our present invention is to provide an efficient switching network for selectively establishing two-way connections between a multiplicity of subscribers with PCM channels distributed over a larger number p of incoming and outgoing subscriber links, on the one hand, and an associated exchange via PCM channels carried on a smaller number q of inputs and outputs of that exchange, on the other hand.

A more particular object is to provide a network of this type enabling also direct communication, bypassing the exchange, between subscribers served by the network.

SUMMARY OF THE INVENTION

As described in our prior U.S. Pat. No. 4,093,827 referred to above, a matrix of the type here envisaged includes a memory for the temporary storage of digitized voice samples—in the form of eight-bit words—received on a plurality of inputs for distribution to as many outputs. Each voice sample is carried in a time slot of a recurrent message frame; with 32 time slots per frame, two of them assigned to supervisory signaling and synchronization, each matrix input and each matrix output carries 30 channels allocated to respective subscribers.

A switching network according to our invention comprises one or more such matrices or STM's for the establishment of time-space signal paths during each frame between $k=p+q$ network inputs and as many network outputs, there being thus pz incoming and outgoing channels where z is the number of time slots per frame; in the specific instances described hereinafter, z is again equal to 32. The k network inputs are respectively connected to the p incoming subscriber links and to the q exchange outputs while the k network outputs are respectively connected to the p outgoing subscriber links and to the q exchange inputs. Thus, signal samples from qz time slots per frame can be transferred from the incoming subscriber links to the exchange and from the exchange to the outgoing subscriber links; this corresponds to a concentration and deconcentration ratio of p:q.

With one or more matrices of eight inputs and eight outputs each, it will be convenient to establish $k=8n$ where n is an integer ranging from one to eight. This allows for the establishment of signal paths between 6n or 7n subscriber links, both incoming and outgoing, and 2n or n exchange junctions, resulting in a concentration and deconcentration ratio of 3:1 in the first instance and 7:1 in the second one.

BRIEF DESCRIPTION OF THE DRAWING

The above and other features of our invention will now be described in detail with reference to the accompanying drawing in which:

FIG. 5 illustrates a medium-capacity three-stage concentrator-deconcentrator; and FIG. 6 illustrates a high-capacity three-stage concentrator-deconcentrator.

SPECIFIC DESCRIPTION

Figure 1:
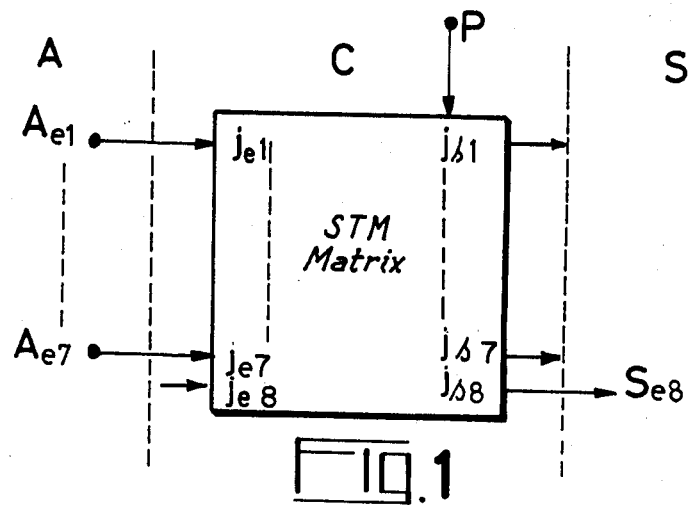
FIG. 1 illustrates a single STM used as a concentrator.

The embodiment illustrated in FIG. 1 comprises a single STM with eight inputs or incoming junctions $j_{e1}-j_{e8}$ and eight outputs or outgoing junctions $j_{s1}-j_{s8}$ serving in part for use of the matrix as a concentrator. Each drawing Figure is divided into three parts separated by two dotted lines, i.e. a part A encompassing incoming subscriber links, a part C representing the matrix proper, and a part S which includes the connections extending between the STM and an associated automatic exchange (not shown).

Each incoming and outgoing PCM junction carries 32 channels allocated to 32 time slots of a recurrent frame.

Seven incoming subscriber links $A_{e1}-A_{e7}$ have been connected to the first seven incoming junctions $j_{e1}-j_{e7}$ which thus accommodate 224 subscribers.

The eighth outgoing junction $j_{s8}$ has been connected to a PCM input $S_{e8}$ of the automatic exchange.

Thus, it is possible to establish 32 time-space paths between 32 time slots distributed in the subscriber links $A_{e1}-A_{e7}$ and the 32 time slots of exchange input $S_{e8}$. To this end, the central unit of the automatic exchange delivers instructions corresponding to these paths to a switching input P of the STM. These instructions are stored in the STM and define respective signal paths which remain established until a subsequent instruction commands a change.

By means of this arrangement, therefore, it is possible to connect the first 32 calling subscribers to the exchange while delaying service to any of the remaining 1932 subscribers desiring to make a call. Accordingly, this arrangement is indeed a concentrator having a concentration ratio of 7:1.

It should be pointed out that any one of the eight matrix outputs could have been selected as the single outgoing junction connected to the exchange, the choice of junction $j_{s8}$ being only one example.

Figure 2:
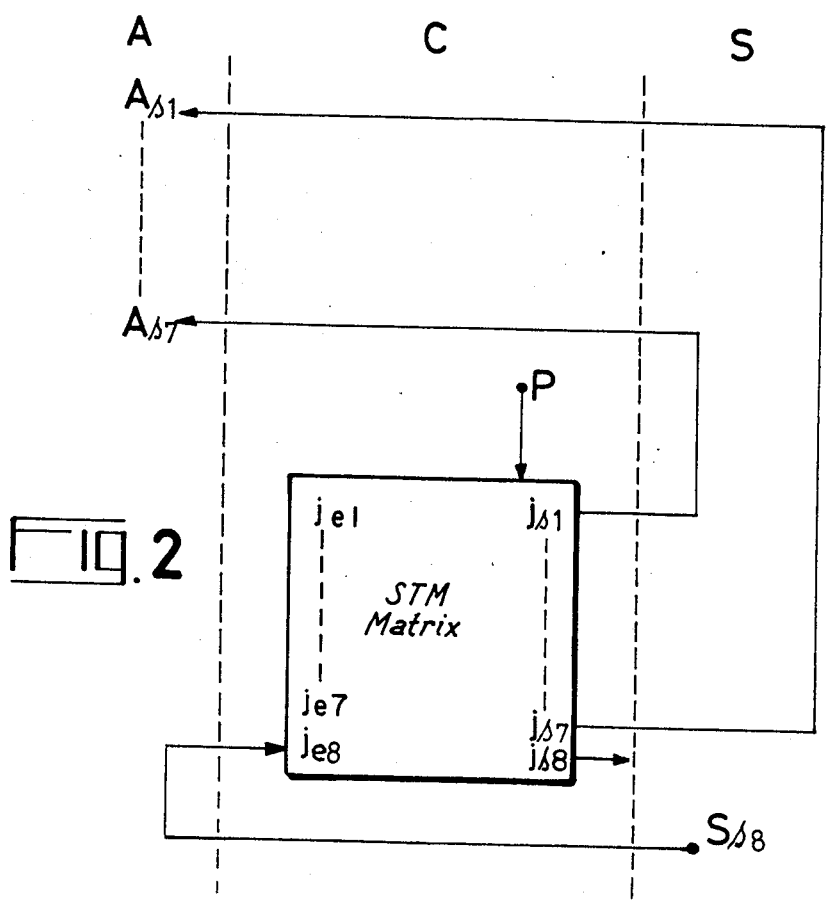
FIG. 2 illustrates a single STM used as a deconcentrator.

FIG. 2 illustrates the matrix of FIG. 1 used as a deconcentrator.

An output $S_{s8}$ of the automatic exchange, associated with its input $S_{e8}$, has been connected to the incoming junction $j_{e8}$ of the STM not utilized for any subscriber connection.

The seven outgoing junctions $j_{s1}-j_{s7}$ of the STM have been connected to as many outgoing subscriber links $A_{s1}-A_{s7}$ respectively associated with the seven incoming links $A_{e1}-A_{e7}$ of FIG. 1.

Thus, it is possible to establish 32 space-time paths between the 32 time slots of exchange output $S_{s8}$ and 32 time slots distributed in the subscriber links $A_{s1}-A_{s7}$ by delivering corresponding instructions to the switching input P. Although it would be possible to extend the outgoing junctions to subscribers other than those connected to the incoming junctions of the matrix, it would be pointless to do so because it is certain that a talking subscriber must also be able to listen so that it is necessary to create for such subscriber a deconcentration path which corresponds to the selected concentration path. The 32 receiving connections of FIG. 2, corresponding to the 32 transmitting connections established according to FIG. 1, represent a deconcentration ratio of 7:1 corresponding to the aforedescribed concentration ratio.

Figure 3:
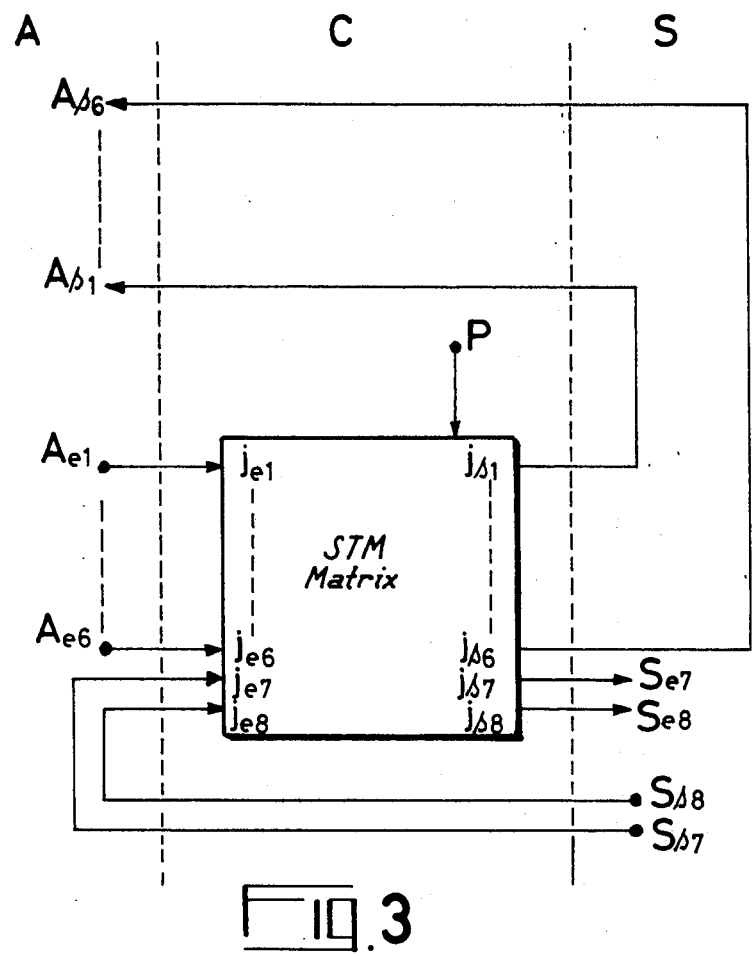
FIG. 3 illustrates a concentrator-deconcentrator having a low concentration ratio.

If a concentration ratio of less than 7:1 is required, we may use an embodiment as shown in FIG. 3 with six inputs and six outputs connected to subscriber links.

In this embodiment, therefore, six incoming subscriber links $A_{e1}-A_{e6}$ and two exchange outputs $S_{s7}$, $S_{s8}$ have been connected to the incoming junctions $j_{e1}-j_{e8}$ whereas six outgoing subscriber links $A_{s1}-A_{s6}$ and two exchange inputs $S_{e7}$, $S_{e8}$ have been connected to the outgoing junctions $j_{s1}-j_{s8}$ of this STM.

In this way, it is possible to establish 64 space-time paths providing simultaneous two-way connections between the automatic exchange and 64 subscribers out of the 192 served by the system. The concentrator-deconcentrator thus formed will therefore have a concentration ratio of 3:1.

Figure 4:
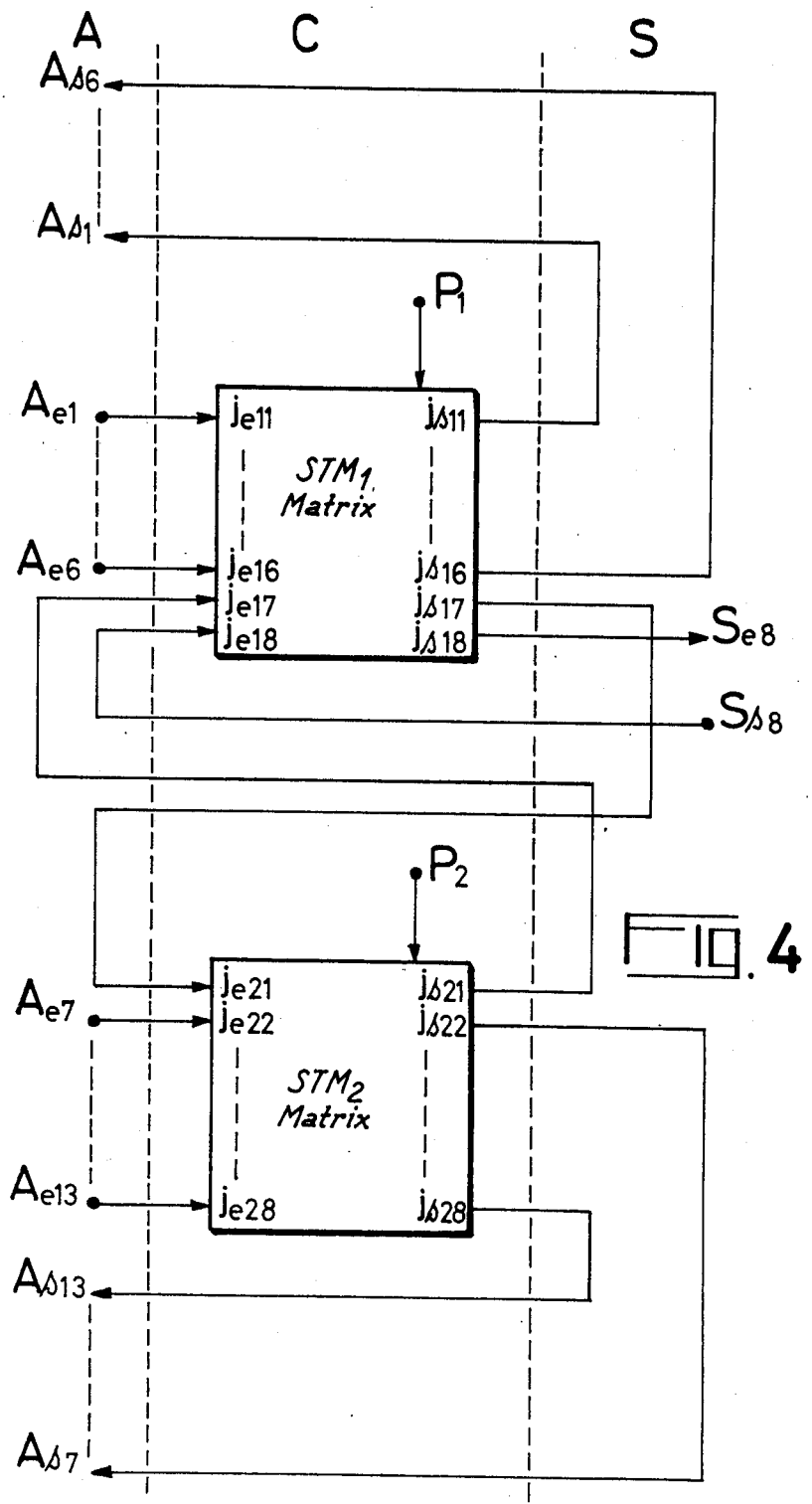
FIG. 4 illustrates a two-stage concentrator-deconcentrator having a high concentration ratio.

If, on the other hand, it is desired to concentrate a larger number of subscriber junctions by using a concentration ratio of greater than 7:1 (still with an STM of eight inputs and eight outputs) we may use a two-stage system such as that illustrated in FIG. 4.

In this system, which comprises two cascaded matrices $STM_1$, $STM_2$, six incoming subscriber links $A_{e1}-A_{e6}$ are connected to the inputs $j_{e1}-j_{e11}$ of matrix $STM_1$, and one exchange input $S_{e8}$ is connected to the output $j_{s18}$ of that matrix. In order to increase the number of connected subscriber links, seven such links $A_{e7}-A_{e13}$ are connected to inputs $j_{e22}-j_{e28}$ of matrix $STM_2$. The output $j_{s21}$ of matrix $STM_2$ is connected to the input $j_{e17}$ of matrix $STM_1$ so that, after concentration in matrix $STM_2$, the subscribers served by links $A_{e7}-A_{e13}$ can be connected to the input $S_{e8}$ of the automatic exchange through matrix $STM_1$.

Accordingly, the 13 incoming subscriber links $A_{e1}-A_{e13}$ are concentrated into a single exchange input $S_{e8}$. It should be noted that this embodiment is not symmetrical between the two STM's in the sense that the junction $j_{e17}$ serves seven times as many subscribers as each junction $j_{e11}-j_{e16}$. Accordingly, it is necessary to re-establish the equilibrium at the level of the central unit of the automatic exchange by offering to the various subscribers equal chances of access to the network. The instructions coming from the central unit are addressed to the STM's through two switching inputs $P_1$ and $P_2$.

For deconcentration, the connections are made in the opposite direction, i.e. an exchange output $S_{s8}$ is connected to the incoming junction $j_{e18}$ of matrix $STM_1$ and six outgoing subscriber links $A_{s1}-A_{s6}$ are connected to the outgoing junctions $j_{s11}-j_{s16}$ of matrix $STM_1$. Similarly, the last free outgoing junction of matrix $STM_1$, i.e. its output $j_{s17}$, is connected to the last free incoming junction of matrix $STM_2$, i.e. its input $j_{e21}$, and the seven outgoing junctions $j_{s22}-j_{s28}$ of matrix $STM_2$ are connected to the seven outgoing subscriber links $A_{s7}-A_{s13}$.

Accordingly, the concentration ratio thus obtained is 13:1.

In all the systems described thus far, it is quite possible by means of a set of suitable instructions to establish a local connection at the level of the concentrator between two subscribers connected thereto. Thus, instead of creating a path between an incoming subscriber link and an input of the automatic exchange, it is equally possible to create a path between this incoming subscriber link and an outgoing subscriber link.

When the concentrators are collectively housed in the exchange, this possibility is of little interest because it complicates the work of the central unit.

When, however, the concentrators are scattered far and wide away from the automatic exchange for serving groups of subscribers, this possibility is interesting because it enables local calls to be made without congesting the connections with the automatic exchange. In this case, the concentrator is called a satellite.

The examples described above correspond to rather low satellite capacities, yet we may increase this capacity in accordance with our invention by interlinking several STM's to form a multistage switching network acting as a concentrator-deconcentrator.

FIG. 5 crossed one such network in the case of 14 incoming and outgoing subscriber links and two automatic-exchange inputs and outputs with six STM's of the aforedescribed type. In order to simplify the drawing, parallel lines have been represented as a single arrow cross by a slanting short stroke juxtaposed with a numeral indicating the number of lines in the multiple. The control leads P etc. of the preceding Figures, carrying the switching instructions to the STM's, have been omitted here.

The switching network is divided into two series chains of three matrices each, i.e. an entrance stage $STM_1$, $STM_4$, a middle stage $STM_2$, $STM_5$ and an exit stage $STM_3$, $STM_6$, with cross-connections between the two chains. Incoming subscriber links $A_{e1}$-$A_{e7}$ and $A_{e8}$-$A_{e14}$ are connected to respective inputs of stages $STM_1$, $STM_4$ whose two remaining inputs are tied to exchange outputs $S_{s1}$, $S_{s2}$. Similarly, outgoing subscriber links $A_{s1}$-$A_{s7}$, $A_{s8}$-$A_{s14}$ are connected to respective outputs of stages $STM_3$, $STM_6$ whose two remaining outputs are tied to exchange inputs $S_{e1}$, $S_{e2}$.

Each middle stage $STM_2$, $STM_5$ has four inputs connected to respective outputs of its own entrance stage and four inputs connected to respective outputs of the corresponding stage of the other chain. Similarly, four of its outputs work into respective inputs of its own exit stage whereas the remaining four outputs work into respective inputs of the corresponding stage of the other chain. The switching operations carried out in these middle stages, therefore, enable the establishment of signal paths between stages $STM_1$ and $STM_6$ or $STM_4$ and $STM_3$, for example.

Thus, it is possible with this system to concentrate and deconcentrate 14 subscriber links with two automatic-exchange junctions. While the concentration ratio is still 7:1, the total capacity is twice as great as in the system of FIGS. 1 and 2.

Other modifications may be used, e.g. by using the layout of the external junctions shown in FIG. 3 with the system of FIG. 5 so as to provide a concentration ratio of 3:1.

It is also possible to expand the concentrator-deconcentrator of FIG. 5 into a network of more than two cross-connected chains.

With the latter network it is possible to concentrate 56 subscriber links $A_{e1}$-$A_{e56}$ and $A_{s1}$-$A_{s56}$ into eight automatic-exchange junctions $S_{e1}$-$S_{e8}$ and $S_{s1}$-$S_{s8}$. In this case, too, each chain of the network has three stages including an entrance stage and an exit stage connected to the subscriber links and exchange junctions in the same way as before. Since there are eight entrance stages and eight exit stages in this instance, the eight inputs and outputs of each middle stage $STM_2$, $STM_5$, . . . $STM_{23}$ are connected to individual outputs of the several entrance stages $STM_1$, $STM_4$, . . . $STM_{22}$ and to individual inputs of the several exit stages $STM_3$, $STM_6$, . . . $STM_{56}$, respectively.

In the embodiment of FIG. 6, the concentration ratio still is 7:1 although the capacity is eight times as great as in the basic system of FIGS. 1 and 2 comprising only one STM.

All the intermediate modes of connection between the networks shown in FIGS. 5 and 6 are of course possible within the scope of our invention.

We claim:

1. A switching network for selectively transferring signal samples between PCM channels distributed over a larger number of incoming and outgoing subscriber links of a telephone system, on the one hand, and PCM channels available on a smaller number of inputs and outputs of an automatic exchange, on the other hand, each of said links carrying a recurrent message frame divided into a multiplicity z of time slots forming PCM channels allocated to respective subscribers served by the exchange, comprising at least one symmetrical time-division matrix for the establishment of time-space signal paths during each frame between $k=p+q$ network inputs and k network ouputs, under the control of switching instructions received from the exchange, said k network inputs being respectively connected to said p incoming subscriber links and to the q exchange outputs, said k network outputs being respectively connected to said p outgoing subscriber links and to the q exchange inputs whereby signal samples from qz time slots per frame can be transferred from said incoming subscriber links to the exchange and from the exchange to said outgoing subscriber links.

2. A switching network as defined in claim 1 wherein $k=8n$, n being an integer ranging from one to eight.

3. A switching network as defined in claim 2 wherein $p=7n$, $q=n$.

4. A switching network as defined in claim 2 wherein $p=6n$, $q=2n$.

5. A switching network as defined in claim 2 wherein $n>1$, comprising n chains of cascaded matrices each including an entrance matrix, a middle matrix and an exit matrix, the middle matrix of each chain having input and output connections to the entrance and exit matrices of all chains, said entrance matrices being provided with said network inputs, said exit matrices being provided with said network outputs.

6. A switching network as defined in claim 1 wherein $p=13$ and $q=1$, comprising a first and a second symmetrical time-division matrix each having eight inputs and eight outputs, six inputs of said first matrix and seven inputs of said second matrix being connected to the 13 incoming subscriber links, six outputs of said first matrix and seven outputs of said second matrix being connected to the 13 outgoing subscriber links, one input and one output of said first matrix being connected to the one exchange output and to the one exchange input, respectively, the remaining input and output of said first matrix being respectively connected to the remaining output and input of said second matrix.

* * * * *